April 12, 1927.

J. E. MARSDEN 1,624,893

ELECTRIC BREAD TOASTER

Filed Nov. 30, 1925    2 Sheets-Sheet 1

INVENTOR
J. E. Marsden
BY
Geo. L. Beeler
ATTORNEY

April 12, 1927.
J. E. MARSDEN
ELECTRIC BREAD TOASTER
Filed Nov. 30, 1925
1,624,893
2 Sheets-Sheet 2
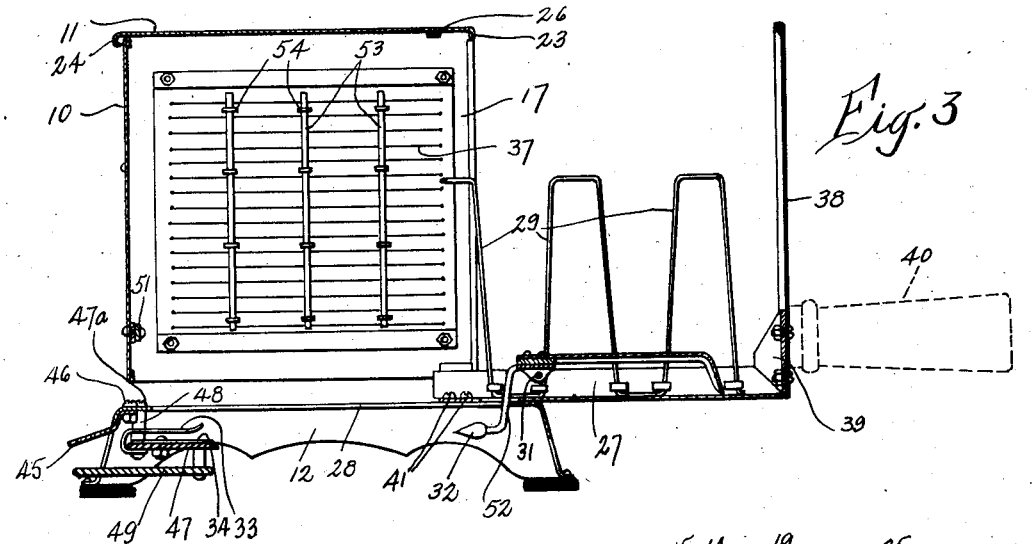
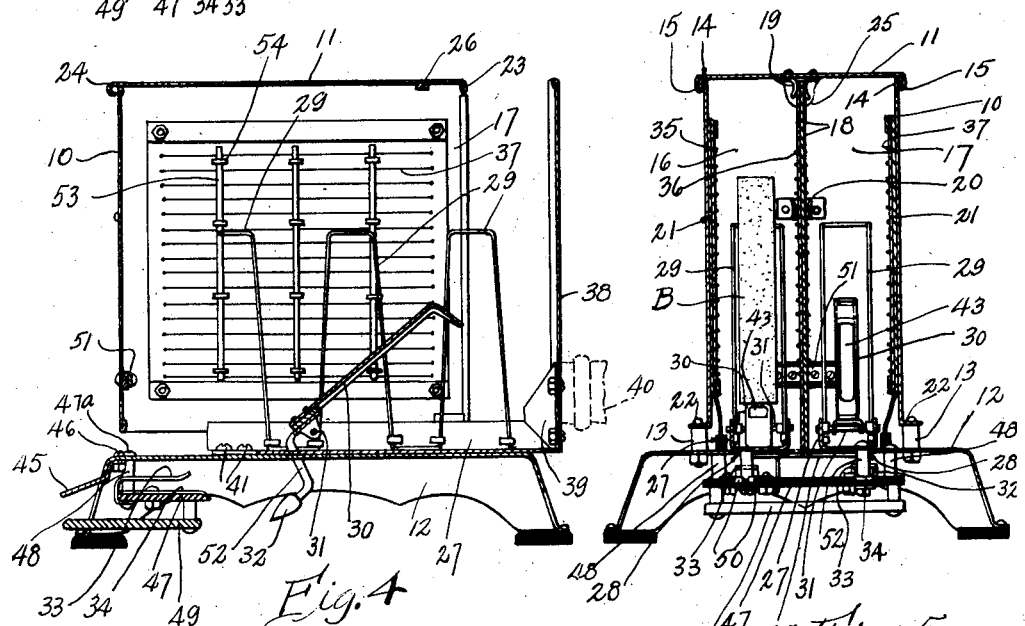
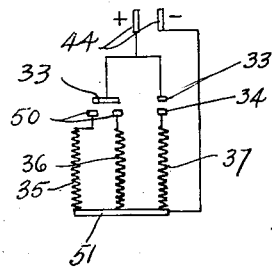
INVENTOR
J. E. Marsden
BY
Geo. L. Beeler
ATTORNEY Patented Apr. 12, 1927.

1,624,893

UNITED STATES PATENT OFFICE.

JOHN E. MARSDEN, OF PHILADELPHIA, PENNSYLVANIA.

ELECTRIC BREAD TOASTER.

Application filed November 30, 1925. Serial No. 72,093.

This invention relates to electrical heating and cooking appliances and has particular reference to an electrical toaster of simplified construction and of novel design.

Among the objects of this invention is to provide an electric bread toaster or the like wherein means are provided co-operating with a plurality of heating coils to permit one or more slices of bread to be toasted as desired and with a minimum of current.

Another object of this invention is to provide an electric bread toaster wherein a plurality of pockets are provided to receive individual slices of bread, electrical heating coils being arranged in association with said pockets in such manner that one of said pockets is operative for toasting both sides of a slice of bread, while the other pocket is operative for toasting but one side of a slice of bread inserted thereinto, whereby when a slice of bread becomes toasted more on one side than on the other as when a slice is cut fresh from a moist loaf having a cut surface exposed for a long time so that the dry side will toast quicker than the moist side and such slice becomes toasted unequally, this pocket is available for rectifying such difference and producing an even toast on both sides of the slice.

Another object of this invention is to provide an electric bread toaster or the like having a plurality of pockets to receive individual slices of bread, electrical heating coils being associated individually with said pockets, and switches being provided for each of said heating coils whereby heat may be imparted to one or both of said pockets as desired for the most effective and minimum use of the electrical current, said switch means being so arranged as to be operative only when a slice of bread is inserted into a pocket, thus rendering the switch mechanism, in a sense, automatic.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Fig. 3 is a sectional view on the line 3—3 of Fig. 2 showing the interior of the toaster in elevation.

Fig. 4 is a sectional view in elevation of the toaster similar to Fig. 3, but with the supporting means for the slices of bread in a different position of operation.

Fig. 5 is a transverse sectional view of the toaster in elevation showing the mechanism in one of said pockets in operation under the weight of a slice of bread, while the other pocket is idle and unoperated.

Fig. 6 is a diagrammatic view showing the wiring of the heating coils.

Figure 1:
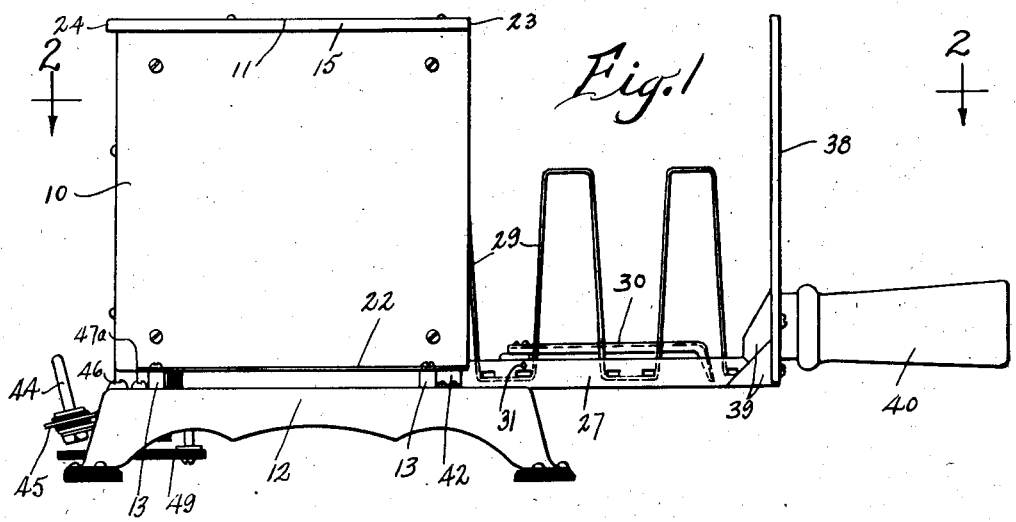
Figure 1 is a side view showing the toaster in elevation and with the supporting means for the bread moved outwardly of the toaster and in position to receive a slice of bread.
Figure 2:
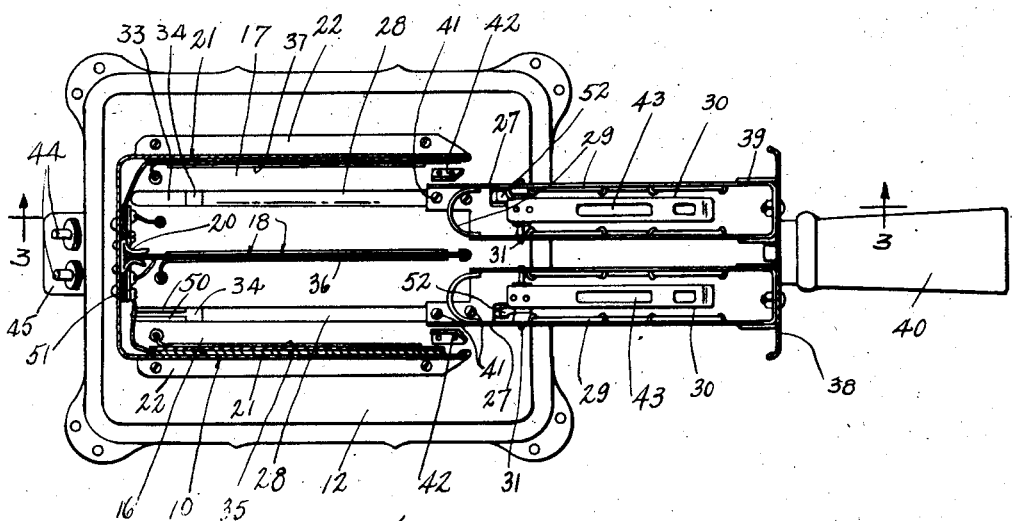
Fig. 2 is a plan view of the toaster taken on the line 2—2 of Fig. 1.

Referring now more specifically to the drawings I show my invention as comprising a casing 10 having a top member 11 which has slidable engagement longitudinally of said casing, a bottom or supporting member 12 being provided upon which said casing is supported in any suitable manner, but preferably in spaced relation thereto by means of the sleeves 13. The casing 10 has a fold or bead 14 extending along the upper edges of the side thereof, while the top or cover member 11 is provided with a fold 15 or the like to engage at the portion 14 for slidably retaining the top 11 in engagement with the casing 10. Partition means is provided within said casing to divide the same longitudinally into two pockets 16 and 17, said partition means being for this purpose formed preferably of thin sheets of mica or other insulating material 18, suitable means being provided to support said partition in upright position, said means taking preferably the form of a clamp 19 secured to the top 11 and extending downwardly to engage said partition, and a clamp 20 upon an end wall of the casing 10 and arranged to engage said partition at an end thereof.

The casing 10 is formed of any suitable material which is preferably of thin metal for the sake of minimum weight and which is nickel plated to reduce the loss of heat by radiation, insulating means being provided along the side walls of said casing to reduce still further the loss of heat, said insulating means taking the form of plates of insulation 21. A flange 22 is provided extending along the bottom of the side walls of said casing and arranged in such manner as to rest upon the sleeves 13 and to be engaged with the base member as by means of screws or the like. Suitable re-enforcing beads are provided along the free edges of the casing for the sake of maximum strength and stiffness thereof. Likewise the top member 11 is provided with beads extending along the ends thereof as at 23 and 24, the latter whereof acts as a stop against the end wall of the casing to limit the movement of the top member therealong by abutment against the end wall of the casing. Said end wall is likewise provided with a notch or cut out 25 to provide clearance for the movement of the switch 19 therethrough when the top has engagement with the casing. A re-enforcement strip 26 is secured transversely to the top member and in spaced relation to the bead 23 to act as re-enforcement for said top member and also as a stop to limit the rearward movement of said top member as by abutment against the end wall of the casing and along the inside surface thereof. It will be understood that when the toaster is being assembled, the top will be readily sprung to permit the member 26 to slip over the top edge of the end wall of the casing after which said member will act as a stop as stated hereinbefore.

Novel supporting means is provided for a slice of bread, said supporting means being movable into or out of the casing and including switch actuating means arranged to close a circuit through a heating coil associated with one of the pockets aforesaid when a slice of bread is deposited on said supporting means, and said supporting means is moved into the casing. More specifically, a pair of channel members 27 are arranged movable lengthwise within the casing and supported directly upon the base member 12. Said base member is slotted along the top surface thereof at 28, while said channel members are provided with means projecting through said slots to act as a guide for said members. Each of said channel members is provided with upright guards or supports 29 at the sides of said members as shown in Fig. 5, and between which a slice of bread is arranged to be positioned within one of said pockets. Actuating members 30 are tiltably supported upon each of said channel members as upon pins 31 which pass through the side flanges of said channel members. Said actuating members carry switch points 32 which are arranged to engage between the leaves or fingers 33 and 34 of the switch provided beneath said base member and supported therefrom. Each of said actuating members 30 is positioned directly between a set of guard members 29 whereby when a slice of bread is placed in position, said actuating member is depressed and retained in depressed position, thus causing the switch point 32 to tilt upwardly and into the proper elevation to engage between the fingers 33 and 34 when the supporting means is moved into the casing. If desired, however, the switch point 32 or such other part of the actuating means as may be found convenient may have abutment relation with the base member 12 as at the forward end of a slot 28 so that when the supporting means is moved outwardly of the casing and to its limiting position, the actuating member will be caused to tilt with its upper end downwardly so that a slice of bread may be readily deposited to rest upon the long lever arm of said actuator, it being understood that said slice of bread will, by reason of the weight thereof, retain said actuator depressed after the supporting means is moved inwardly into the casing.

Heating coil means are provided associated individually with the pockets 16 and 17, said heating coils being operated according as one of said pockets is being used to toast a slice of bread. Preferably, however, I provide a heating coil 35 comprising a winding 36 which is formed upon the central partition of the casing, the winding 36 being threaded through said partition so that one part of the turns thereof lies within the pocket 16 and another part within the pocket 17. It will now be seen that when a current is fed through the coil 35 that heat will be radiated upon a slice of bread B on both sides thereof. Likewise a certain quantity of heat will be radiated into the pocket or chamber 17. However, inasmuch as the partition 36 is formed of relatively thin material such as mica or the like and so as to have a low heat capacity and relatively high heat conductivity, that the heat so radiated into the pocket 17 will usually be available for heating also the pocket 16, comparatively little of such heat being lost inasmuch as the entire partition will heat up quite rapidly. The pocket 17, however, is preferably provided with a coil 37 positioned only upon that side of the pocket opposite to the partition. When a slice of bread is inserted into the pocket and the supporting means is moved into the casing, the switch co-operating with the coil 37 will be closed and current fed to said coil, thus causing the slice of bread to be toasted upon but one side thereof. The utility of this arrangement has been set forth hereinbefore wherein it was stated that often times a slice of bread may toast more rapidly upon one side than upon the other. Assuming therefore that such is the condition of a slice of bread B which has been toasted in the pocket 16, the same may be removed and inserted into the pocket 17 and with the pale side thereof toward the coil 37 and retained in the pocket 17 for such time as may be desired and while the pocket 16 is not in operation. My invention provides in this respect a distinctly novel idea and constitutes an important advance in the art in the point of convenience and utility.

Both of the channel members 27 are preferably arranged to be movable as a unit as by being secured to an upright door member 38 which is operative to close the end opening of the casing 10 when the supporting means is moved into the casing. More specifically, said channel members are secured to said door members as by means of bracing clips 39. Likewise a handle 40 has rigid engagement with said door member near the lower portion thereof whereby the supporting means is operative as a unit and the casing opened or closed. Inasmuch as each of said channel or supporting members has engagement with the base 12 of the toaster as by means of screws 41 or the like which pass through the slots 28 in said base, it will be seen that a comparatively strong and rigid construction is provided. Additional guide means such as the clips 42 may be provided secured to the base 12 and whereby an easy and uniform movement of the supporting members is assured. The door member is suitably beaded along its edges for the sake of strength and neatness in operation as an effective closure for the casing.

The tilting members 30 in effect constitute carriers for the slices of bread positioned on said supporting means and are consequently of sufficient width for this purpose. They may be slotted as desired as shown at 43 in order to insure a proper and uniform positioning of the slices thereon.

The means for supplying electric current to said heating coils includes a conventional plug connection such as the pins 44 which are arranged to be inserted into a normal socket and are mounted upon a supporting plate 45 which is secured to the base member of the toaster as by means of screws 46. The switch pins 33 and 34 are mounted upon a plate of insulation 47 which acts likewise to properly insulate them from each other. Said plate of insulation is in turn supported from the base member 12 by means of screws 47ª and the spacing sleeves 48. In this way the switch points are retained in relatively fixed relation and in position to properly receive the switch closing means 32 to permit the circuits to be closed. As additional protecting means an insulating plate 49 which is made of relatively strong and stiff material is attached to the plate 47 and suitably spaced therefrom. The switch operating in connection with the coil 35 has one of its members split into a pair of points 50 as shown in Fig. 5, one of these points having connection with that portion of the coil which is wound at a side of the chamber 16 adjacent to the side wall of the casing 10, while the other point is connected with the winding 36. It will thus be seen that these two windings are not in series, but rather in multiple with each other and that the circuit is closed in connection with each of them when the switch member 32 enters and establishes electrical connection between the members 33 and 50.

The electrical circuit can readily be traced out by referring to the diagram shown in Fig. 6 in which one of the contact pins 44 which is designated by a plus sign to receive positive current is connected to a switch point 33, while the winding 35 and the winding 36 both have connection with the switch points 50 and at their other ends with a bar 51 which is connected to the negative pin 44. Likewise current is taken from the positive pin and passes through the coil 37 to the bar 51 and thence to the negative pin. It will now be seen that when a switch member 32 is moved into switch closing position that the circuit will be closed simultaneously through the windings 35 and 36 and that when its companion switch closing member is moved into closing position it will bridge the contact points 33 and 34 and close the circuit through the coil 37. It is apparent likewise that either or both of said switches may be operated in any manner or order as desired.

This electric toaster has been arranged to be of simplified construction and to be as easy to operate as possible. The tilting members 30 operated wholly through the action of gravity due to the fact that the switch closing means 32 is heavier than the long lever arm which is arranged to be held in depressed position by a slice of bread positioned thereon. In other words, no springs or similar mechanical devices are resorted to. It is likewise seen that when the bread supporting means is moved wholly without the casing that the members 52 which support the switch closing means 32 will abut against the ends of the slots 28 and thus forcibly tilt said carrier members and cause the long lever arms thereof to be depressed, thus facilitating the insertion of a slice of bread between the guard members 29 and in proper position upon said supporting means.

The coils at the sides of the casing 10 and at the partition 18 are formed in a particularly simple manner as by being threaded through plates of mica, strips of mica 53 or the like being used to retain the turns of the different coils in close relation to the plates of mica whereon they are supported, suitable binding means such as the wires 54 being used to tie said strips to the mica plates.

I claim:

1. In an electric toaster, the combination of a casing, an electrical heating coil therein, a support for a slice of bread movable into or out of said casing, and switch means for said coil operative by said support when the same is moved into said casing to close the circuit.

2. In an electric toaster, the combination of a casing, an electrical heating coil therein, a support for a slice of bread movable into or out of said casing, said support comprising a carrier movable under the weight of a slice of bread, and switch means for said heating coil having co-operation with said carrier when the same is moved as aforesaid and when said support is moved into said casing whereby said switch means is closed to cause a current to flow through said heating coil.

3. In an electric toaster, the combination of a casing, an electrical heating coil therein, a switch for said coil, and means for supporting a slice of bread in said casing, said means being movable into current closing position under the weight of said slice of bread, and comprising means to close said switch when so moved.

4. In an electric toaster, the combination of a casing, an electrical heating coil therein, a switch for said coil, and a support for a slice of bread movable into and out of said casing, said support having a tiltable member arranged to tilt about an approximately horizontal axis, said member having means at the lower end thereof to close said switch, said member being arranged to be tilted by the weight of a slice of bread when the same is placed upon said supporting means, whereby the lower end of said tiltable member is lifted so that said means is in position to close said switch when said support is moved into said casing.

5. In an electric toaster, the combination of a casing, an electrical heating coil therein, a switch for said coil, and a support for a slice of bread movable into and out of said casing, said support having movable means including a member to close said switch, said movable means being arranged to be moved under the weight of a slice of bread deposited on said support and into position to cause the member actuated thereby to close said switch when said support is moved into said casing, but said member being arranged so as to be inoperative with respect to said switch when said support is idle and is then moved into said casing to be retained in neat and compact relation therein while the toaster is standing idle.

6. In an electric toaster, the combination of a casing, a plurality of pockets therein to receive individual slices of bread, a partition being provided between said pockets, and heating coil means associated with one of said pockets including a winding threaded through said partition from side to side to radiate heat into both of said pockets simultaneously, said partition having an electrical insulating quality and being relatively thin to have a low heat capacity and relatively high heat conductivity, said heating coil means being arranged to toast upon both sides a slice inserted into the pocket associated with said heating coil means, the other pocket being provided with a heating coil upon that side thereof opposite to said partition whereby both sides of a slice of bread inserted thereinto can be toasted when both coils are operated, or only one side toasted when the last mentioned coil alone is operated.

7. In an electric toaster, the combination of a casing, a heating coil therein, a switch for said coil, a support for a slice of bread movable into and out of said casing in an approximately horizontal direction, a member borne by said support, and means borne by said member operative to close said switch, said member being mounted tiltably on said support, the switch closing means serving by the superior weight thereof to depress that end of said member whereon it is mounted causing the other end of said member to be raised upwardly, the upper end of said member being depressed by a slice of bread deposited on said support thus elevating the switch closing member into position to engage and close said switch when said support is moved into said casing and with said slice supported thereon, but said switch closing means being tiltable by gravity out of engaging position with said switch when said slice is removed whereby when said support is then moved into said casing said heating coil will be unoperated.

8. In an electric toaster, the combination of a casing, a plurality of pockets therein to toast individual slices of bread inserted into said pockets, individual heating coils for said pockets, switches having individual co-operation with each of said heating coils, and means for rendering each switch operative under the weight of a slice of bread as the same is inserted into a pocket as aforesaid.

9. An electric toaster as set forth in claim 4 wherein means is provided on said casing co-operating with said member to depress the upper end thereof when said support is moved outwardly of the casing substantially to its limit of motion.

In testimony whereof I affix my signature.

JOHN E. MARSDEN.